April 17, 1956 — R. A. DANDL — 2,742,576
PORTABLE SCINTILLATION SURVEY METER
Filed Feb. 14, 1952
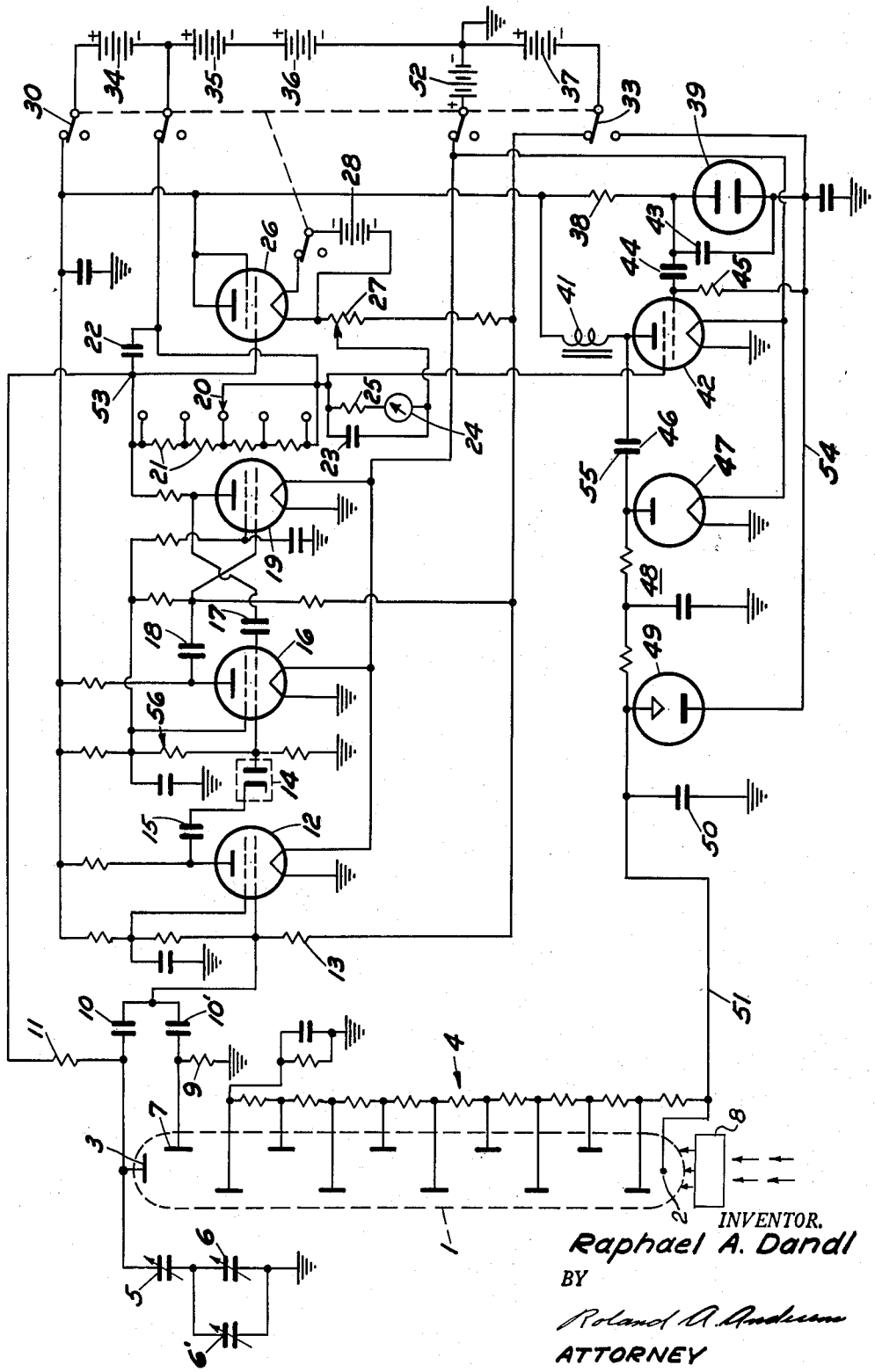
INVENTOR.
Raphael A. Dandl
BY
Roland A. Anderson
ATTORNEY

United States Patent Office

2,742,576
Patented Apr. 17, 1956

2,742,576

PORTABLE SCINTILLATION SURVEY METER

Raphael A. Dandl, Auburn, Ala., assignor to the United States of America as represented by the United States Atomic Energy Commission Application February 14, 1952, Serial No. 271,568

6 Claims. (Cl. 250—71)

The present invention relates to apparatus for the detection of radioactivity, and more especially to a portable, highly sensitive apparatus for detecting radioactive particles and radiations and measuring and indicating the intensity or rate of occurrence thereof.

Portable elements heretofore constructed for the detection of radioactivity and the location of radioactive materials have suffered from a number of defects. The primary fault is a lack of sensitivity, so that weak sources of radiation would be entirely overlooked by most portable survey instruments. Portable gamma scintillation counters have been built, but they have not generally been reliable for continuous use, because changes in tube characteristics and in voltage supply magnitude inevitably result from the ageing of tubes and decay of batteries employed. These changes alter the magnitude of the output pulses so as to spoil the accuracy of the count-rate circuit, which depends upon receipt of exactly uniform pulses corresponding to each event detected. Scintillation detectors are more sensitive than other detectors of the prior art, but the design of scintillation-type survey meters necessitates an unusually stable high voltage supply for the photomultiplier tube, together with an accurate means for controlling the tube gain which does not interfere with the voltage supply stability. This combination of requirements has not been met successfully in portable instruments to the degree of accuracy desired, so that scintillation counters have been restricted to stationary laboratory devices.

Design of a portable count-rate meter instrument of high sensitivity with acceptable accuracy requires that for each particle or ray striking the detector a fixed quantity of charge be delivered to an integrating circuit. Only if such is the case will the total charge be an accurate indication of the number of rays or particles emitted per unit time by the source of radiation surveyed. Therefore, each pulse delivered to the rate-meter circuit should be uniform in amplitude, duration, and wave-form. Moreover, the sensitivity of the device must be adjustable so that extremely weak or very intense sources may be intelligently surveyed by one instrument. The characteristics of the pulses delivered to the rate-meter depend upon several factors, including the voltages impressed on the photomultiplier tube electrodes which control the gain of that tube, the pulse amplifier stage, and the pulse shaper stage.

The present invention provides portable, compact means for producing substantially identical pulses of the character desired from a scintillation phosphor detector and for counting and indicating their rate of occurrence with great accuracy. It embodies in a portable survey instrument the sensitivity and reliability of large laboratory counting arrangements. In its broadest aspects, the present invention comprises an improved portable count-rate radiation survey meter having an extremely sensitive detector element, means for producing electrical pulses responsive thereto, and means for counting and indicating the rate of occurrence of such pulses. More specifically, the invention comprises a scintillation detector and means for determining the rate of response of the detector to radiation, including a compact, novel, portable electronic circuit arrangement especially adapted for a scintillation count-rate meter.

The present invention provides means for controlling the size of the photomultiplier output pulses in an inexpensive, convenient manner which does not require the control element to be in the high voltage lead. More important, the multiplier tube characteristics remain unchanged by use of this control. The gain may be adjusted from zero to substantially the normal maximum output of the tube, yet standard portable circuit components are used throughout. The size and shape of the pulses may be kept substantially constant despite ageing batteries, change in tube characteristics (other than ageing of the multiplier tube), or changes in load current of the photomultiplier, in a manner more fully described hereinafter.

Accordingly, the principal object of this invention is to provide a compact, portable, and very sensitive instrument to detect and indicate the rate of incidence of radioactive particles and radiations.

A further object of this invention is to provide a portable, battery powered counting rate meter of extremely high sensitivity and reliability.

Other objects and advantages of the present invention may be ascertained from the following detailed description, when read in conjunction with the accompanying drawing, which illustrates a circuit diagram of a preferred embodiment thereof.

In the drawing the photomultiplier tube 1 is schematically represented as a series of electrodes including the photo-cathode 2 and the collecting anode 3. Scintillation phosphor 8 is disposed adjacent the photo-cathode 2 in the conventional manner so that when radiation strikes the phosphor, light emitted thereby will fall on the photocathode. The tube is energized from a negative high voltage supply through lead 51 and the voltage divider 4, which may comprise a series of resistances coupling the tube dynodes. The last dynode 7 and the anode 3 are connected through the amplifier input through separate and equal capacitances 10, 10'. In addition, a variable capacitance including condensers 5, 6, 6' is connected between anode 3 and ground. Resistance 9 couples dynode 7 to ground. Thermionic amplifier tube 12 is energized from a battery voltage supply including cells 34, 35 and 36 connected in series, and from the filament battery 52. Amplifier 12 is coupled through condenser 15 and diode 14 to the input of thermionic tube 16, which, together with tube 19, form a trigger pair. Coupling capacitors 17, 18 couple the anodes of the respective tubes to the grid of the opposite tube, in the conventional manner. Range switch 20, having resistors 21 connected between its contacts and shunted by capacitor 22, is connected in the anode circuit of tube 19. The anode of tube 19 is also coupled to the control grid of vacuum tube 26, energized by separate filament battery 28 through on-off switch 30 by batteries 34, 35, 36. The arm of range switch 20 is coupled through the parallel network including capacitor 23, microammeter 24, and resistor 25 to the zero adjust potentiometer 27 in the cathode circuit of tube 26.

Resistance 11 connects anode 3 with the input to the grid of tube 26 in the rate meter circuit at junction 53, so that the instrument may be used at very high radiation levels where the pulse-type circuits would jam. The average photomultiplier anode current is then taken as an indication of radiation level.

The highly regulated supply voltages for the photomultiplier tube are furnished from a negative power supply. Tube 42, energized from batteries 34—36 and filament battery 52, draws plate current through a choke or inductance 41. Control of the tube is effected through its grid circuit including resistor 45, coupling capacitor 44, and a relaxation oscillator comprising the neon bulb 39 and capacitor 43 connected in parallel. Current for the neon bulb is drawn through resistor 38. Instead of connecting the neon bulb to ground in the conventional manner, lead 54 is coupled to a corona-regulator tube 49, the other electrode of which is coupled to the output lead 51. Capacitor 50 and network 48 serve as filter elements in the power supply. Sudden interruption of plate current of tube 42 by firing of bulb 39 causes a large, positive inductive "kick" of the plate voltage. Capacitor 46 therefore charges through rectifier 47. As the "kick" is of short duration, the capacitor 46 quickly discharges, so that capacitor plate 55 assumes a negative potential. Battery 37 furnishes grid bias for tube 12 through resistor 13 when switch 33 is in the "on" position as shown.

In normal operation of the survey meter, switch 30 is thrown to the "on" position to supply proper electrode voltages for the circuit tubes. By adjustment of capacitor 6 a portion of the electron current collected on the anode 3 may be degenerated, so that the current from dynode 7 delivers a large positive pulse to the amplifier 12, through capacitor 10', then the negative pulse from anode 3, through capacitor 10. The resultant output pulse from the amplifier cuts off tube 16, causing tube 19 to conduct. Tube 16 again begins to conduct and tube 19 is cut off, so that a negative square wave appears at the plate of the tube. Diode 14 is so biased by voltage divider 56 that the square wave is more nearly independent of the magnitude of the amplifier output pulse. The square waves each deposit a fixed amount of charge on capacitor 22. The total charge is measured by a vacuum-tube voltmeter circuit arrangement including tube 26 as a function of the voltage across the range resistor 21 and indicated on meter 24.

The peculiar problems involved in deriving uniform pulses from a portable scintillation detector in the manner described required that the voltages on the photomultiplier tube and other vacuum tube electrodes be essentially constant, so the present invention includes a stable interrupter-tube-relaxation oscillator type power supply, which is not so sensitive to load changes, battery voltage changes, and interrupter tube current as are the circuits of the same general type of the prior art. In operation, decay of battery voltages would normally decrease interrupter tube current, thus lowering the voltage on lead 51. But the corona-regulator 49 couples this decrease through resistor 45 directly to the control grid of tube 42, lowering the grid bias of that tube, and allowing more plate current to flow. This increased current will cause a larger voltage "kick" to be coupled to the rectifier, and will compensate for the tendency of the voltage at lead 51 to decrease. Tendency of the output voltage to change due to large-scale changes in load current drawn by the photomultiplier are compensated in a like manner. Since the relaxation oscillator voltage is nearly twice the striking voltage of tube 39, the oscillator frequency is insensitive to battery voltage changes, insuring continuous operation at peak efficiency.

To insure that the trigger circuit tube 16 is properly actuated by even the smallest pulses from amplifier 12, diode 14 is coupled between capacitor 15 and the control grid of tube 16. The potential of the plate of the diode is determined by the values of the resistance network 56, and is so fixed that a very small voltage (of the order of .2 volt) will cause tube 16 to conduct from its normally cutoff condition. The diode also serves to decouple the amplifier from the trigger circuit during the triggering cycle, so that the square pulses at plate of tube 19 are more uniform.

The magnitudes of the resistor 11, connecting anode 3 to the source of supply voltage, and of the capacitors 5, 6, 6' are so determined that the fall time of a pulse at dynode 7 is equal to the fall time of the pulse at anode 3, to keep the two pulses of substantially equal duration or width. This determination may be made conveniently with the aid of an oscilloscope.

In a preferred embodiment, photomultiplier 1 may be type 5819; phosphor 8 may be a sodium iodide crystal activated with thollium; tubes 12, 16, and 19 may be type CK–522–AX; tubes 26 and 42 may be type CK–526–AX; tube 47 may be type VX–21; tube 49 may be type 5841; and bulb 39 may be type NE–51.

Thus it may be seen that the present invention comprises an improved portable scintillation-type count-rate meter, together with electronic components peculiarly required for use of such detectors in portable radiation survey meters. The vacuum tubes were chosen for their small size and dependability, but it is obvious that other tubes are available which would be employed equally as effectively. One skilled in the art will appreciate that the component values should be changed if different vacuum tubes were employed, for example, and are not in any sense critical.

Having described my invention, I claim:

1. A portable, very sensitive device for detecting radioactivity comprising a scintillation detector including a phosphor and a photomultiplier tube having a series of spaced dynodes and a collecting anode; power supply means for generating and applying to said photomultiplier a plurality of different negative potentials; pulse amplifying means provided with input and output circuits; means for combining into a single input pulse the pulse occurring at said anode and that occurring at the next adjacent dynode; means for connecting said input pulses to said input circuit; and count-rate means connected to said amplifying means to determine and indicate the rate of receipt of pulses thereto.

2. A portable, very sensitive device for detecting radioactivity comprising a scintillation detector including a phosphor and a photomultiplier tube having a series of spaced dynodes and a collecting anode; power supply means for generating and applying to said photomultiplier a plurality of different negative potentials; means for forming into a single input pulse the pulse collected at said anode and that received at the next adjacent dynode; means for amplifying recurring input pulses, and count-rate means connected to said amplifying means to indicate the rate of receipt thereof; in which said means for forming input pulses comprises a source of potential connected to energize all of said dynodes save the dynode nearest said anode, a variable load resistor, a source of anode voltage connected through said resistor to said anode, variable capacitance means connected between said anode and a point of fixed potential, resistance means connecting said dynode adjacent the anode to said point of fixed potential, and an output circuit including a pair of equal capacitors, one of said capacitors being connected to said anode, the other of said capacitors being connected to said last-named dynode, the remaining terminals of said capacitors being connected together to form one side of said output circuit, said point of constant potential being the other side of said circuit.

3. In a portable, very sensitive device for detecting radioactivity comprising a scintillation detector including a phosphor and a photomultiplier tube having a series of spaced dynodes and a collecting anode; means for combining into a single input pulse the pulse collected at said anode and that received at the next adjacent dynode; means for amplifying recurring input pulses, and count-rate means connected to said amplifying means to indicate the rate of receipt thereof; improved means for energizing said photomultiplier tube comprising batteries, a relaxation oscillator including a gas discharge device having one electrode coupled to said batteries, an interrupter tube having an inductance in its anode circuit and energized by said batteries, a rectifier coupled to said anode circuit between said anode and said inductance, and a means coupling the output of said rectifier to said gas discharge device to complete the energizing circuit therefor, said discharge device being coupled to the control grid circuit of said interrupter tube to govern the firing cycle thereof.

4. A portable, very sensitive device for detecting radioactivity comprising a scintillation detector including a phosphor and a photomultiplier tube having a series of spaced dynodes and a collecting anode; power supply means for generating and applying to said photomultiplier a plurality of different negative potentials; means for combining into a single input pulse the pulse collected at said anode and that received at the next adjacent dynode; means for amplifying recurring input pulses, and means connected to said amplifying means to indicate the rate of receipt thereof, in which the dynode nearest said anode is connected through a first resistance to a point of reference potential, said anode is coupled to a source of positive potential through a second resistance and to said point of reference potential through a variable capacitance, a pair of equal capacitances coupling said anode and said dynode, their junction forming an output circuit with respect to said reference potential, said second resistance being of such value that the full time of a pulse at said dynode is substantially equal to the full time of the pulse at said anode, and said variable capacitance comprising an adjustable capacitor, a first capacitor connected in parallel therewith, and a second capacitor connected in series therewith.

5. A portable, very sensitive device for detecting radioactivity comprising a scintillation detector including a phosphor and a photomultiplier tube having a series of spaced dynodes and a collecitng anode; power supply means for generating and applying to said photomultiplier a plurality of different negative potentials; means for deriving a positive pulse and a larger negative pulse from said tube, a pair of equal capacitances, one terminal of each capacitance being coupled together and the other terminals being coupled respectively to the anode and next adjacent dynode of said tube for combining into a single input pulse the pulse collected at said anode and that received at the next adjacent dynode; means for amplifying pulses from said coupling means; and countrate means connected to said amplifying means to determine and indicate the rate of receipt of pulses thereto.

6. In a portable scintillation detector including a photomultiplier tube, means for providing a regulated energizing potential for said tube comprising plate and filament batteries, a relaxation oscillator including a capacitor and a gas discharge device having one electrode coupled to the positive side of said plate batteries, an interrupter tube having an inductance in its anode circuit and energized by said batteries, a rectifier coupled to said anode circuit between said anode and said inductance, and a corona-discharge device coupled between the output of said rectifier and the second electrode of said gas discharge device to complete the voltage supply circuit therefor, and resistance means coupling the control grid of said interruptor tube with said second electrode of said gas discharge device.

References Cited in the file of this patent
UNITED STATES PATENTS

| | | |
|---|---|---|
| 2,412,423 | Rajchman et al. | Dec. 10, 1946 |
| 2,517,404 | Morton | Aug. 1, 1950 |
| 2,576,661 | Wouters | Nov. 27, 1951 |
| 2,610,303 | Bell | Sept. 9, 1952 |
| 2,617,042 | Wouters | Nov. 4, 1952 |
| 2,675,478 | Bruton et al. | Apr. 13, 1954 |